No. 660,535. Patented Oct. 23, 1900.
C. C. TAINTOR.
SAW SETTING IMPLEMENT.
(Application filed Mar. 27, 1900.)
(No Model.)
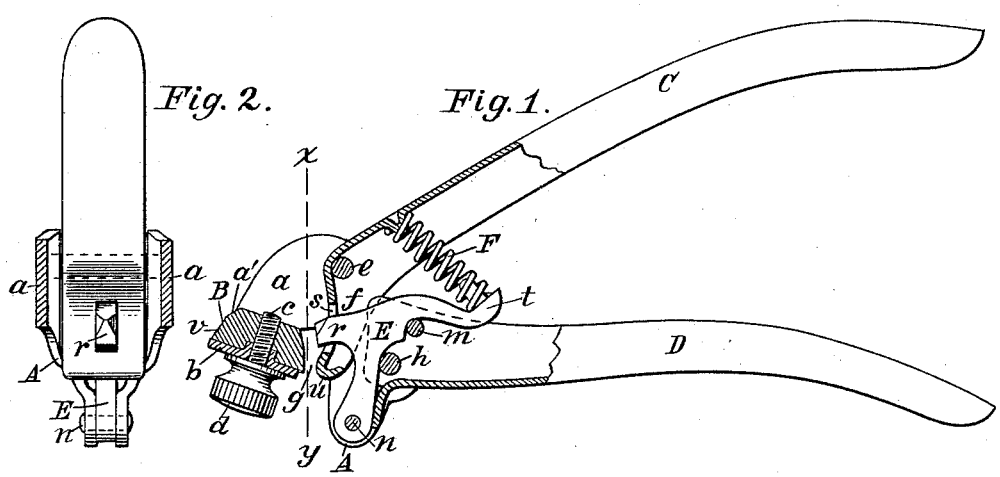
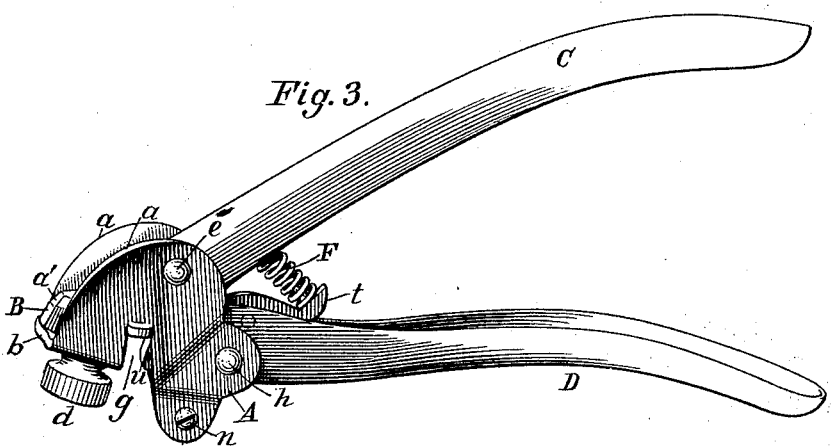
WITNESSES
Amaziah Whitney
Daniel Street
INVENTOR
Charles C. Taintor
per
James A. Whitney
ATTY

UNITED STATES PATENT OFFICE.

CHARLES C. TAINTOR, OF ELIZABETH, NEW JERSEY, ASSIGNOR TO THE TAINTOR MANUFACTURING COMPANY, OF NEW YORK.

SAW-SETTING IMPLEMENT.

SPECIFICATION forming part of Letters Patent No. 660,535, dated October 23, 1900.

Application filed March 27, 1900. Serial No. 10,346. (No model.)

*To all whom it may concern:*

Be it known that I, CHARLES C. TAINTOR, a citizen of the United States, residing in Elizabeth, in the county of Union and State of New Jersey, have invented certain new and useful Improvements in Saw-Setting Implements; and I do hereby declare that the following is a full, clear, and exact description of the same, reference being had to the accompanying drawings, making a part of this specification, in which—

Figure 1 is a longitudinal sectional view of an apparatus made according to my invention. Fig. 2 is a transverse sectional view of the same, taken on the line $xy$ of Fig. 1. Fig. 3 is a perspective view of the same.

This invention comprises a novel combination of parts whereby I provide a saw-set of simple, strong, and durable construction and one in which the power required to operate the setting-punch in due connection with the anvil is very advantageously applied.

A is the frame of the implement. This frame has the two sides or cheek-pieces $a$, which at the outer end of the implement are connected by the cross part $b$. These parts $a$ and $b$ of the frame are intended to be integral. Upon the inner side of the cross-piece $b$ is placed the anvil B. This latter may be of any ordinary or appropriate structure. As shown in the drawings, it is of the rotary kind, well known in the art as adjustable to meet the requirements of the teeth of variously-constructed saws and attached in position on the cross-piece by a central screw $c$, which is provided with a milled head $d$, which may be turned to tighten the screw when occasion arises for the adjustment of the anvil to bring one or another of its faces in relation with the setting-punch of the apparatus.

C is the upper handle of the implement. This is pivoted between the cheeks of the frame A at the upper part thereof, as shown at $e$, with its short arm $f$ opposite the anvil with a space $g$ between, as shown in Fig. 1. D is the lower handle of the implement. This is pivoted at $h$ between the cheeks of the frame, as shown in Fig. 3 and more clearly in Fig. 1. The handles C and D are hollow or concavo-convex in their cross-section in the manner well understood in the art. Placed transversely within the hollow of the handle D is a stud or pin $m$. Pivoted at the lower part of the frame, as shown at $n$ in Figs. 1, 2, and 3, is a dog E. Upon the front of this dog, as at $r$, is the setting-punch, which extends upward toward the anvil B, and, as hereinbefore explained, is arranged opposite the anvil.

The setting-punch is capable of projecting through an opening $s$ in the adjacent wall of the short arm $f$ of the upper handle to permit the punch to approach the anvil in the use and operation of the implement. Extended back from the dog and in a direction opposite to that of the punch is a shank $t$, which at its rear side is borne against by the pin or stud $m$ of the lower handle D. The punch and the shank are intended to be integral with other portions of the dog. The shank projects back beyond this pin or stud $m$, and between the rear end of the shank and the opposite part of the upper handle C is a spring F, which presses the shank against the transverse pin $m$ to retain it in due relation therewith, notwithstanding the varying distances between the handles when the implement is applied to use.

In the operation of the apparatus the two handles C D are grasped by the hand of the operator in the usual manner and the blade of the saw to be set is inserted in the space $g$, the saw-teeth to be set being moved to bring them in succession between the end of the punch $r$ and the opposing facet of the anvil B, that portion of the blade of the saw which is adjacent to its teeth being between the nose $u$ of the short arm of the upper handle and the lower part $v$ of the anvil. This done the handles are brought toward each other with the result that the nose $u$ of the short arm of the upper handle is brought against the saw-blade and the latter is pressed firmly against the lower part $v$ of the anvil and is held in fixed relation with the latter and with the punch and with its teeth in due relation with that one of the sloping facets $a'$ of the anvil which is immediately opposite the punch. The movement of the lower handle causes its transverse stud or pin $m$ to force outward the dog E, thereby bringing the punch against the saw-tooth and pressing it against the facet of the anvil, thereby "setting" it at an angle to the saw-blade corresponding to that of the anvil-facet which is opposite to said saw-blade. By releasing the grip upon the handles they are permitted to expand to permit another tooth of the saw-blade to be brought into due relation with the punch and anvil, the spring F meanwhile tending to spread apart the handles, and by pressing the shank $t$ upon the stud or pin $m$ placing the dog in position for a repetition of the setting operation.

By the described construction and operation of parts I obtain a strong leverage upon the setting-punch, which enables it to act with great force and certainty in bending or setting the teeth, thereby securing great positiveness and uniformity in the work performed.

What I claim as my invention is—

1. In a saw-set the combination with a frame and a handle pivoted in said frame with its short arm arranged to hold against the saw-blade, of a dog pivoted in the frame and having a punch extended toward the anvil and a shank extended in a direction opposite that of the punch, of a handle having a stud which bears against the shank of the dog, and a spring interposed between the shank and the handle which carries the stud, substantially as herein set forth.

2. In a saw-set the combination with a frame and an upper handle pivoted at the upper part of said frame with its short arm arranged to hold against the saw-blade, of a dog pivoted at its lower end in the lower part of the frame and constructed with a punch which extends toward the anvil and a shank which extends in an opposite direction, a lower handle having a stud which bears against the shank of the dog, and a spring between the said shank and the upper handle the whole arranged for joint operation, substantially as herein set forth.

CHARLES C. TAINTOR.

Witnesses:
AMAGRAH WHITNEY,
DANIEL S. DECKER.